United States Patent Office 2,942,938
Patented June 28, 1960

2,942,938

METHOD OF DISSOLVING MASSIVE PLUTONIUM

John F. Facer and Ward L. Lyon, Richland, Wash., assignors to the United States of America as represented by the United States Atomic Energy Commission No Drawing. Filed Dec. 9, 1952, Ser. No. 325,019

7 Claims. (Cl. 23—14.5)

This invention deals with a method of dissolving massive plutonium, such as plutonium buttons and casting skulls. (A casting skull is the dross of plutonium metal and oxide which remains in the pouring crucible for casting plutoninum after the plutonium has drained from the pouring crucible into the casting crucible.)

For most plutonium recovery processes nitric acid solutions of the plutonium are preferred; this is true, for instance, for plutonium precipitation processes and also for solvent extraction methods. It has been tried to dissolve massive plutonium in concentrated nitric acid, but after a relatively short time the plutonium was passivated by the nirtic acid and no further dissolution took place. Concentrated nitric acid was therefore considered unsatisfactory for this purpose. Hydrogen iodide has also been used and found to yield a good and fast dissolution of the metal; however, the use of hydriodic acid involves serious corrosion problems.

It is an object of this invention to provide a process for dissolving massive plutonium which requires a relatively short period of time.

It is another object of this invention to provide a process for dissolving massive plutonium in which the corrosion is considerably reduced so that stainless steel equipment can be used.

It is still another object of this invention to provide a process for dissolving massive plutonium by which a plutonium solution is obtained that is immediately usable for further processing and plutonium recovery.

It is also an object of this invention to provide a process for disintegrating massive plutonium into a powdery product.

It has been found that, when a small quantity of hydrofluoric acid is added to concentrated boiling nitric acid, massive plutonium pieces are dissolved within from 4 to 21 hours. 16 M nitric acid containing about 0.04 M hydrofluoric acid proved to be the preferred concentrations, and approximately 500 milliliters of the acid mixture were found satisfactory for about 100 grams of plutonium material. After the plutonium pieces have been dissolved, the solution formed, following filtration and dilution, is ready for processing by methods known to those skilled in the art.

A still better process of dissolution, however, was found to result if the massive plutonium is first subjected to a preliminary oxidation step prior to the dissolution proper. This, according to the process of this invention, is advantageously carried out by treating the plutonium in an autoclave with water at at least 140° C. An exothermic reaction takes place by which plutonium hydroxide and/or the hydrated oxide is produced in the form of a powder. In carrying out the oxidation step the autoclave containing the plutonium and water is first heated to a temperature of from 140 to 150° C.; supply of heat is then discontinued. The reaction which at about 140° C. takes place to such a degree that the heat developed is sufficient to make it self-sustaining then automatically proceeds to completion, there being no further attention necessary. The temperature in the autoclave rises due to the reaction heat developed, possibly up to about 240° C. The reaction is usually completed after about one-half hour but, for the sake of safety, treatment for one hour is advisable. The oxide or hydroxide powder obtained is of a dark olive-green to black color.

After the autoclave has then cooled down to room temperature or almost room temperature, the content may be diluted with water and filtered to remove any water-soluble impurities; these dilution-filtration steps, however, are optional. The plutonium compound formed is then dissolved in a boiling-hot nitric acid-hydrofluoric acid mixture. While the nitric acid concentration for the dissolving step may range from 8 to 16 M and have a hydrofluoric acid content of from 0.04 to 0.25 M, concentrations of 16 M nitric acid and 0.04 M hydrofluoric acid are preferred. The plutonium compound powder of the autoclave is completely dissolved in the acid mixture within an hour. If the solution contains an undissolved residue it may be removed by filtration. The solution is then ready for introduction into a plutonium recovery cycle.

Instead of carrying out the oxidation step with water at superatmospheric pressure, it may also be effected with boiling nitric acid of from 0.1 to 4 M at atmospheric pressure. A concentration of 0.5 M nitric acid is optimal, and treatment by refluxing is especially advantageous.

In the following an example comprising three runs is given which illustrates the satisfactory results obtained with hydrofluoric acid-containing nitric acid, and also the further improvement brought about by a preliminary oxidation step. Pyrex containers were used in all three experiments for the dissolving step. Oxidation in the two last experiments was carried out by treating the plutonium pieces with water in an autoclave and initially heating to 140° C. The autoclave was then left without any attention or heat supply for one hour, after which it was cooled with cold water. The results of these experiments are listed in the following table.

| Process | Metal Dissolution | Metal Oxidation and Oxide Dissolution | |
|---|---|---|---|
| Form of Plutonium | Buttons | Buttons | Skulls |
| Weight of Plutonium gms | 18 | 11 | 15 |
| Vol. of 16 M HNO₃—0.04 M HF ml | 250 | 250 | 250 |
| Percent of Pu Dissolved after: | | | |
| ½ hour | | 100 | |
| 1 hour | 18 | | 100 |
| 4 hours | 25 | | |
| Time Required for Complete Dissolution hrs | 21 | ½ | ½ |
| Time Required for Oxidation, Including Bomb Loading, Reaction, Cooling, and Unloading hrs | 0 | 1½ | 1½ |
| Total Process Time hrs | 21 | 2 | 2 |

These experiments show the considerable saving of time that is possible by using a preliminary oxidation step; this again entails a saving of equipment, because less corrosion takes place in a shorter period of time.

It will be understood that this invention is not to be limited to the details given herein but that it may be modified within the scope of the appended claims.

What is claimed is:

1. A process of dissolving massive plutonium, comprising heating the plutonium and water under superatmospheric pressure to about 140 to 150° C., maintaining the pressure while discontinuing heat supply whereby oxidation of the plutonium takes place and a powdery material is formed, and treating the powder obtained with concentrated hot nitric acid which contains a small quantity of hydrofluoric acid whereby all plutonium is dissolved.

2. The process of claim 1 wherein the concentration of the nitric acid ranges from 8 to 16 M and the concentration of the hydrofluoric acid present in the nitric acid ranges from 0.04 to 0.25 M.

3. The process of claim 2 wherein the nitric acid concentration is 16 M and that of the hydrofluoric acid 0.04 M.

4. A method of dissolving massive plutonium comprising contacting the plutonium with a hot mixture of concentrated nitric acid and a small quantity of hydrofluoric acid.

5. The process of claim 4 wherein contacting is carried out by refluxing.

6. The process of claim 4 wherein the concentration of the nitric acid ranges from 8 to 16 M and the concentration of the hydrofluoric acid present in the nitric acid ranges from 0.04 to 0.25 M.

7. The process of claim 6 wherein the nitric acid concentration is 16 M and that of the hydrofluoric acid 0.04 M.

References Cited in the file of this patent

Zimmerman: "Justus Liebig's Annalen der Chemie," vol. 216, page 18 (1883).

Moissan: "Comptes Rendus," vol. 122, page 1092 (1896).

Harvey: "Nucleonics," vol. 2, No. 4 (April 1948), page 32.